US010106175B1

(12) United States Patent
Shirchenko et al.

(10) Patent No.: US 10,106,175 B1
(45) Date of Patent: Oct. 23, 2018

(54) ALERT SYSTEM AND METHOD FOR VEHICLE WITH EXTENDABLE SERVICE COMPONENT

(71) Applicant: DiCAN Inc., St. Catharines (CA)

(72) Inventors: Michael Shirchenko, St. Catharines (CA); Kenneth Edward Stapleton, St. Catharines (CA)

(73) Assignee: DiCAN, Inc., St. Catharines (CA)

( * ) Notice: Subject to any disclaimer, the term of this patent is extended or adjusted under 35 U.S.C. 154(b) by 0 days.

(21) Appl. No.: 15/939,113

(22) Filed: Mar. 28, 2018

(51) Int. Cl.
| | |
|---|---|
| *B60R 1/12* | (2006.01) |
| *B60W 50/14* | (2012.01) |
| *B60P 1/44* | (2006.01) |
| *G07C 5/00* | (2006.01) |
| *G08G 1/127* | (2006.01) |

(52) U.S. Cl.
CPC .......... *B60W 50/14* (2013.01); *B60P 1/4464* (2013.01); *G07C 5/008* (2013.01); *G08G 1/127* (2013.01); *B60W 2050/143* (2013.01); *B60W 2050/146* (2013.01)

(58) Field of Classification Search
CPC ............. B60W 50/14; B60W 2050/143; B60P 1/4464; G07C 5/008; G08G 1/127
USPC ............. 340/425.5, 435, 436, 457, 679, 685
See application file for complete search history.

(56) References Cited

U.S. PATENT DOCUMENTS

| | | | | |
|---|---|---|---|---|
| 2,887,672 A | * | 5/1959 | Morano et al. ......... | B60P 1/283 200/52 A |
| 3,528,055 A | * | 9/1970 | De Falco .................. | B60P 1/04 200/61.58 R |
| 4,442,915 A | * | 4/1984 | Steel ....................... | B60P 1/162 180/271 |
| 5,906,648 A | * | 5/1999 | Zoratti .................. | B66F 17/003 340/436 |
| 6,263,039 B1 | * | 7/2001 | Ducharme ............. | G01G 19/08 377/15 |
| 6,847,892 B2 | | 1/2005 | Zhou et al. | |
| 7,412,307 B2 | * | 8/2008 | Pillar ....................... | B65F 3/00 180/281 |

(Continued)

FOREIGN PATENT DOCUMENTS

| | | | |
|---|---|---|---|
| CN | 205098046 U | * | 3/2016 |
| KR | 101125229 B1 | * | 3/2012 |
| KR | 101205112 B1 | * | 11/2012 |

*Primary Examiner* — Eric M Blount
(74) *Attorney, Agent, or Firm* — Knobbe, Martens, Olson & Bear, LLP (57) ABSTRACT

Described are system and methods in which the speed of a service vehicle and the configuration of an extendable service component of the vehicle may be monitored. The vehicle can be driven with the extendable service component out of its home configuration as long as the speed is below a speed threshold. However, if the speed of the vehicle exceeds the speed threshold while the extendable service component is out of its home configuration, an extended service component alert signal is transmitted. Although a local alarm may (also) be provided to the vehicle operator, the extended service component alert signal is transmitted wirelessly and provides one or more alerts on at least one receiver remote from the vehicle, such as on a mobile phone of a supervisor who can take action. In some embodiments, the speed threshold may vary depending on the location of the vehicle.

16 Claims, 5 Drawing Sheets

(56) References Cited

U.S. PATENT DOCUMENTS

| | | | | |
|---|---|---|---|---|
| 7,895,965 B2* | 3/2011 | Casey | ................... | B60P 1/283 |
| | | | | 116/28 R |
| 7,898,403 B2 | 3/2011 | Ritter et al. | | |
| 9,111,234 B2 | 8/2015 | Wallace et al. | | |
| 9,790,069 B2* | 10/2017 | Davis | ................... | B66F 11/042 |
| 9,845,039 B2* | 12/2017 | Anderson | ................ | B60P 1/16 |
| 2011/0282631 A1* | 11/2011 | Poling | ................... | G06Q 10/10 |
| | | | | 702/188 |
| 2015/0248794 A1* | 9/2015 | Hashimoto | ........... | E02F 9/2066 |
| | | | | 701/50 |
| 2016/0157202 A1* | 6/2016 | Butler | ................. | H04W 4/029 |
| | | | | 455/456.1 |

* cited by examiner

ALERT SYSTEM AND METHOD FOR VEHICLE WITH EXTENDABLE SERVICE COMPONENT

BACKGROUND

On Jul. 31, 2014, a dump truck, driving with its box up, slammed into the overhead truss of the Burlington Skyway, a bridge forming part of the Queen Elizabeth Way, a major Canadian thoroughfare. The damage required closure of the highway and extensive repairs.

Such dump trucks are merely one example of a service vehicle which has an extendable service component (in this case the dump box). As used herein, the term "service vehicle" refers to a vehicle which can perform at least one specific service task beyond mere locomotion and transportation, and which is designed to travel between sites over conventional roadways.

The term "extendable service component" refers to a component of a service vehicle that is movable between a "home" configuration in which the component is stowed or otherwise positioned for safe travel by the service vehicle on a roadway, and one or more extended configurations for performing the service task(s). A dump truck is therefore a service vehicle, since it can not only transport material in its dump box but can also unilaterally unload such material at a work site (a service task) by tilting its dump box and opening the gate. The dump box is hence the extendable service component, which when fully down is in its home configuration and when raised is in an extended configuration. A ladder truck used in firefighting is another example of a service vehicle, with its ladder being its extendible service component. Other examples include mobile cranes (the crane arm being the extendable service component), street cleaning machines (for which the discharge gate is the extendible service component), and utilities boom trucks, often called "cherry pickers" (for which the boom arm is the extendible service component).

The operator of the service vehicle provides the first line of defense, and it is known to provide an alarm to alert the operator of a service vehicle if the operator inadvertently attempts to drive the service vehicle on a roadway with the extendable service component out of the home configuration. One problem with providing an alarm is that it is often the operator's own inattentiveness which led to driving in a non-homed condition, and that same inattentiveness may lead to the alarm being ignored as well. Another known approach is to provide an interlock to prevent a service vehicle from being driven at all when the extendable service component is out of the home configuration. Using an interlock may obviate the inattentiveness problem, but is inappropriate in cases where it may be necessary to drive, albeit at low speed, with the extendable service component extended. For example, a dump truck may drive forward slowly with its box raised so as to spread material over a target area. Thus, neither an alarm nor an interlock provide a satisfactory solution.

DETAILED DESCRIPTION

The present disclosure describes a system and method in which both the speed of a service vehicle and the configuration of an extendable service component of the service vehicle may be monitored. In one embodiment, the service vehicle can be driven with the extendable service component out of its home configuration as long as the speed is below a speed threshold. However, if the speed of the service vehicle exceeds the speed threshold while the extendable service component is out of its home configuration, an extended service component alert signal is transmitted. Although a local alarm may (also) be provided to the vehicle operator, the extended service component alert signal is transmitted wirelessly and provides one or more alerts on at least one receiver that is physically remote from the service vehicle, such as on a mobile phone of a supervisor who can take action. In some embodiments, the speed threshold may vary depending on the location of the service vehicle.

Figure 1:
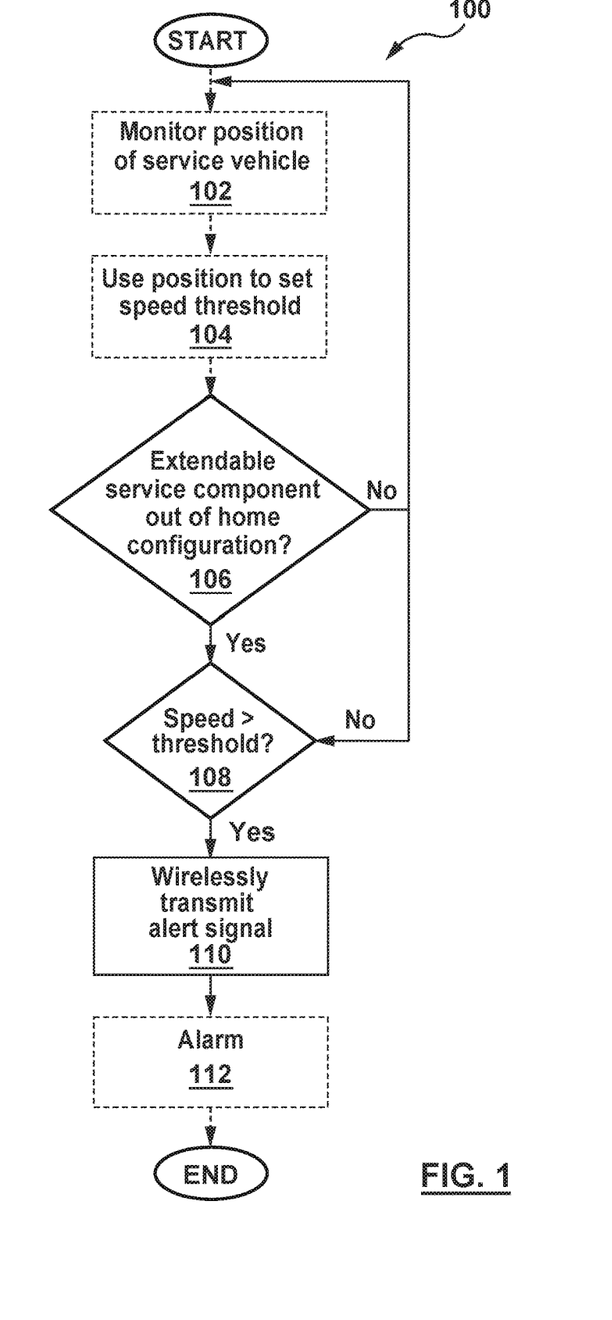
FIG. 1 is a flow chart showing an exemplary method for monitoring operation of a service vehicle according to an aspect of the present disclosure.

Reference is now made to FIG. 1, in which a flow chart showing an exemplary method for monitoring operation of a service vehicle is indicated generally at reference 100. Certain optional steps of the method 100 are shown in dashed lines; these optional steps are included in embodiments in which a speed threshold is location-specific, and may be omitted for an embodiment in which the speed threshold is fixed. For example, a dump truck may have a speed threshold of five miles per hour inside of a worksite so that it can drive with its box up to spread material, but may have a speed threshold of zero outside of the worksite (e.g. the dump box should always be down when driving on public roads).

At optional step 102, the method 100 monitors a position of the service vehicle. The position may be monitored using any suitable technology, including without limitation GPS positioning technology, cellular triangulation, inertial measuring units, dead reckoning from a known start location using wheel revolutions and steering angles, or any combination thereof. At optional step 104, the method 100 uses the position of the service vehicle, as determined at optional step 102, to set the speed threshold. For example, geo-fencing may be used to define the boundary of a worksite. In such an arrangement, if it is determined at step 102 that the vehicle is inside the worksite, the speed threshold may be set to, for example, 5 miles per hour, but if it is determined at step 102 that the vehicle is outside the worksite, the speed threshold may be set to zero.

At step 106, the method 100 monitors the configuration of the extendable service component of the service vehicle. Monitoring the configuration of the extendable service component of the service vehicle at step 106 may comprise monitoring the inputs from one or more component sensors. The monitoring at step 106 is intended to determine whether or not the extendable service component is in its home configuration.

In the illustrated embodiment, if the method 100 determines at step 106 that the extendable service component is in its home configuration, the method 100 returns to optional step 102 (where present) and continues to monitor the configuration of the extendable service component of the service vehicle (Step 106). However, if the method 100 determines at step 106 that the extendable service component is out of its home configuration, the method 100 proceeds to step 108.

At step 108, the method 100 monitors the speed of the service vehicle to check whether it exceeds the speed threshold (e.g. a predetermined speed threshold or the speed threshold set at step 104). Monitoring the speed of the service vehicle may be carried out, for example, by processing a signal from a speed sensor, from a sensor coupled to a suitable part of the service vehicle (e.g. a sensor to count the number of rotations of a particular wheel to determine RPM), or by calculating a change in position over time, with position being monitored using any suitable technology, including without limitation GPS positioning technology, cellular triangulation and inertial measuring units, or any combination of the foregoing. If the method determines at step 108 that the speed of the service vehicle does not exceed the speed threshold, the method 100 returns to optional step 102 (where present) and continues to monitor the configuration of the extendable service component of the service vehicle (step 106).

FIG. 1 shows step 106 (monitor the configuration of the extendable service component of the service vehicle to check if it is in the home configuration) as preceding step 108 (monitor the speed of the service vehicle to check whether it exceeds the speed threshold). Thus, in the exemplary embodiment of the method shown in FIG. 1, the speed of the service vehicle is only checked against the speed threshold if the extendable service component of the service vehicle is out of the home configuration. Alternatively and equivalently, step 108 may precede step 106, and the configuration of the extendable service component may only be checked if the speed of the service vehicle exceeds the threshold. Moreover, another equivalent arrangement is for steps 108 and 106 to be performed simultaneously.

Step 110 is performed only in response to a determination that the extendable service component is out of its home configuration while the speed of the service vehicle exceeds the speed threshold. Thus, step 110 is responsive to there being both (a) a determination at step 106 that the extendable service component is out of its home configuration; and (b) a determination at step 108 that the speed of the service vehicle exceeds the speed threshold. At step 110, the method 100 wirelessly transmits an extended service component alert signal to provide at least one alert on at least one receiver remote from the service vehicle.

Optionally, at step 112 the method 100 may further provide an alarm inside the operator compartment of the service vehicle, which may include audible (e.g. a buzzer) and visible (e.g. a flashing light).

Importantly, the alert resulting from the extended service component alert signal transmitted at step 110 is not the same as the alarm that may optionally be provided at step 112. The same factors (e.g. inattention, inebriation or even incaution) which led to the condition that triggered the alarm may lead the operator to ignore the alarm. Thus, the method 100 also takes steps to notify an individual other than the operator by, at step 110, wirelessly transmitting an extended service component alert signal to provide at least one alert on at least one receiver remote from the service vehicle. The term "remote", as used in this context, means that the receiver is not carried on the service vehicle, and may be located outside of the visual range of the service vehicle, and may even be outside of the direct wireless communication range of the service vehicle. In one preferred embodiment, the receiver(s) may comprises a wireless mobile telephone and the at least one alert comprises an automated phone call and/or text message (e.g. short message service aka "SMS", iMessage or the like) and/or e-mail, which may include status information and location information relating to the service vehicle. For example, the alert resulting from the wireless extended service component alert signal at step 110 may be a text message to a supervisor's wireless mobile telephone saying "ALERT: Dump truck #109 has its box raised on the westbound QEW between Guelph Line and Brant Street". This enables the supervisor to take action, for example by radioing or telephoning the operator, or notifying the highway patrol (Ontario Provincial Police in this case). Optionally, the alert may go to multiple entities (e.g. one or more supervisors and the highway patrol). Also optionally, the alert may go to the operator's wireless mobile telephone as an alternative means of alerting the operator. The operator may have covered the warning light with his/her hat and turned up the music too loud to hear the buzzer but may still feel the vibration of his or her phone.

Figure 2:
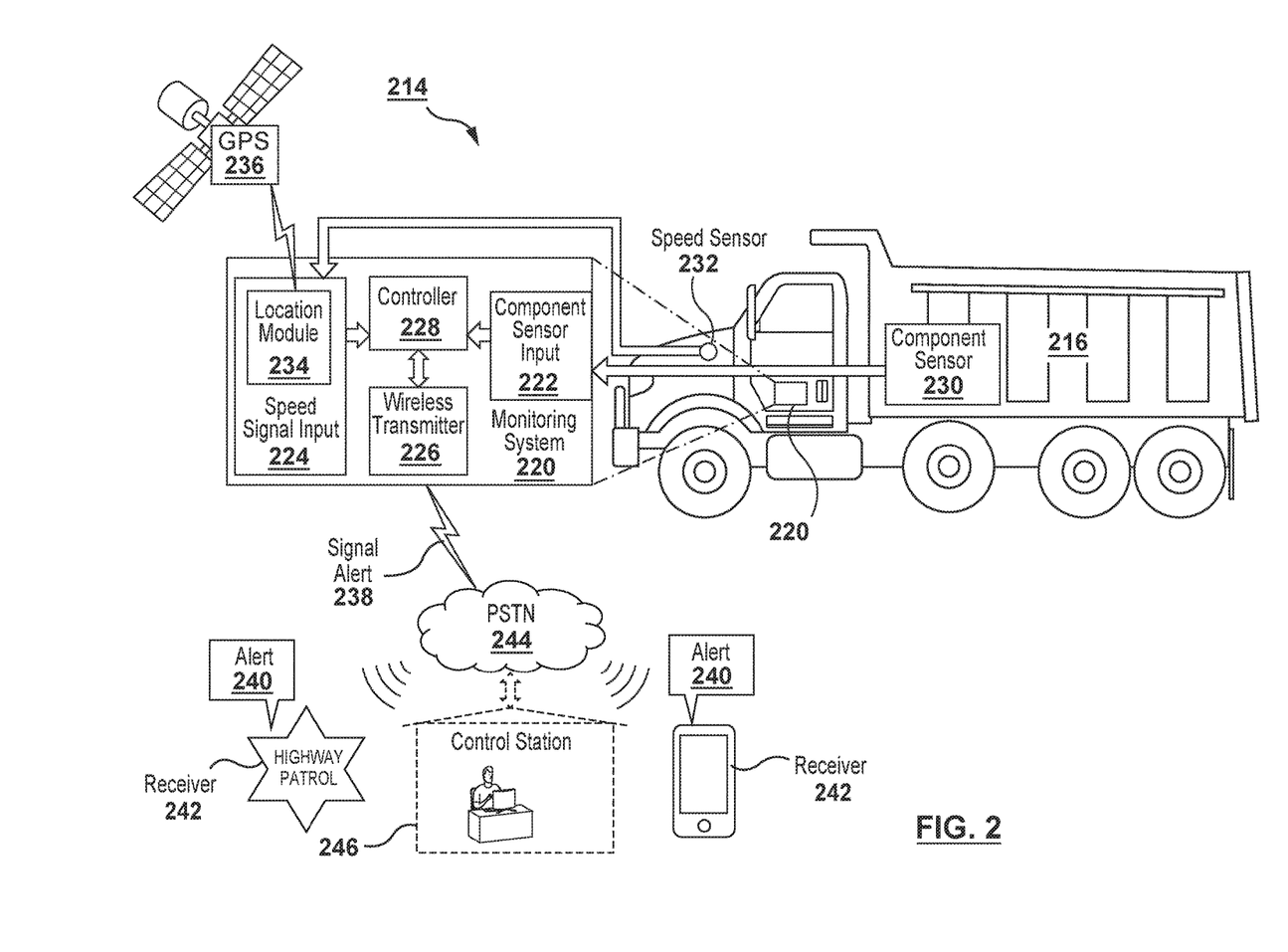
FIG. 2 is a block diagram showing an exemplary monitoring system for monitoring operation of a service vehicle according to an aspect of the present disclosure.

Reference is now made to FIG. 2, which is a block diagram showing an exemplary monitoring system, indicated generally at 220, for monitoring operation of a service vehicle 214, in this case a dump truck, having an extendible service component 216, in this case a dump box. The use of a dump truck is merely illustrative and is not intended to be limiting. The monitoring system 220 may, in some embodiments, comprise a suitably programmed automatic vehicle location ("AVL") unit, which may already be installed on the vehicle. Examples of AVL systems include the Road Operations and Data Analysis (ROADA) system offered by DM&T Services Ltd., having an address at 75 East Beaver Creek Road, Unit 6, Richmond Hill, Ontario, Canada, L4B 1B8, those offered by Webtech Wireless/BSM Technologies Inc., having an address at 75 International Blvd., Suite 100, Toronto, Ontario, Canada M9W 6L9, those offered by Geotab Inc., having an address at 21-1075 North Service Road West, Oakville, Ontario, Canada L6M 2G2 and those offered by Fleet Complete, having an address at WaterPark Place, 88 Queens Quay West, Suite 200, Toronto, Ontario, Canada M5J 0B8. Other embodiments (e.g. non-AVL embodiments) of a monitoring system are also envisioned. As such, FIG. 2 illustrates the monitoring system 220 in block diagram form to more generally elucidate its components.

The monitoring system 220 comprises a component sensor input 222, a speed signal input 224, a wireless transmitter 226 (in this case a transceiver that can both send and receive) and a controller 228 coupled to the component sensor input 222, the speed signal input 224 and the wireless transmitter 226. The term "controller", as used herein, includes a programmable logic controller (PLC), a suitably programmed computer, a microcontroller, a non-programmable physical circuit having the requisite hardware configuration to carry out the required functions, and any combination of the foregoing. Where the monitoring system comprises an AVL unit, the speed signal input 224, wireless transmitter 226 and controller 228 all form part of the AVL unit.

In one embodiment where the monitoring system comprises an AVL unit, the component sensor input 222 may consist of a direct terminal input of the AVL unit and therefore the component sensor input 222 may also form part of the AVL unit. In other preferred embodiments, where the monitoring system comprises an AVL unit, the component sensor input 222 may comprise a direct terminal input of the AVL unit and a driver alert circuit electrically interposed between the respective component sensor and the direct input terminal, as described in greater detail below. The speed signal input 224 is adapted to receive speed information signals representing a speed of the service vehicle 214. Typically, the speed signal input 224 is adapted to be coupled to the speed sensor 232 of the service vehicle 214 and the speed information signals comprise speed sensor signals. In some embodiments, the speed signal input 224 comprises (or is coupled to) a location module 234 and is adapted to continuously update a location of the service vehicle 214. As such, the speed information signals may be (or may include) locations of the service vehicle. In such an embodiment, the controller 228 may be configured to determine the speed of the service vehicle 214 by comparing changes in the location to elapsed time between locations; alternatively, the location information may be transmitted elsewhere for such calculation. The location module 234 may receive signals from GPS satellites 236 and use those signals to determine location in known manner; alternatively other locating methods, e.g. cellular triangulation, may be used. FIG. 2 shows the speed signal input 224 coupled to the speed sensor 232 of the service vehicle 214 to receive speed sensor signals and also coupled to the location module 234 to receive location information from GPS satellites 236 in order to illustrate both approaches. While both approaches may be used in a single embodiment (e.g. to provide redundancy), as a matter of economy typically only one or the other would be used. The location module 234 may thus be coupled to the controller 228 other than through the speed signal input 224.

Although not shown in FIG. 2, in operation the components are of course coupled to a suitable source of power, for example a power system of the service vehicle (possibly with battery backup). The component sensor input 222, speed signal input 224, wireless transmitter 226, controller 228 and GPS receiver 234 are all carried by the service vehicle 214. The exemplary monitoring system 220 can implement the method 100 described in the context of FIG. 1.

The component sensor input 222 is adapted to receive one or more component sensor signals representing a configuration of an extendable service component of the service vehicle. Depending on the nature of the extendable service component, it may have one or more moving parts that must be in a specific position to constitute the home configuration. For example, a dump box on a dump truck may be in the home configuration only if (a) it is fully lowered; and (b) its gate is fully closed. Similarly, a telescopic crane arm may be in the home configuration only if (a) it is fully lowered; (b) it is longitudinally aligned with the vehicle travel direction; (c) all telescoping members of the crane arm are fully retracted; and (d) the hook is secured in its transport receptacle. Thus, there may be one or more component sensors, each providing signals representing an aspect of the configuration of the extendible service component. For example, photoelectric sensors, magnetic sensors, infrared sensors and/or physical contact sensors, among others, may be used. For example, a dump truck may have a physical contact switch on its chassis that is biased open but is moved to the closed position by the dump box when the dump box is in the fully lowered position, and may have a photoelectric sensor that is obstructed when the gate is closed. For simplicity of illustration, only a single component sensor 230, indicating when the dump box 216 is in the fully lowered position, is shown in FIG. 2. In some embodiments, the component sensor(s) 230 may include or be coupled to a timer, for example a delay circuit, with a minimum activation time required (e.g. to avoid a signal resulting from a momentary movement of the extendable service component 216 when the service vehicle 214 drives over an uneven roadway). Alternatively, the sensitivity of the sensors may be attenuated to avoid false positive signals.

Where multiple sensors are used, the monitoring system 220 may have a plurality of component sensor inputs 222 for the component sensors, or may have a single component sensor input 222, as shown, that receives the output signal from a suitable array of AND and/or NAND and/or OR gates that receives the component sensor signals from the individual component sensors. Such an array of AND and/or NAND and/or OR gates could be configured to produce a signal only if the combination of component sensor signals from the individual component sensors indicates that the extendable service component is in its home configuration. Equivalently, with a suitably programmed system an array of AND and/or NAND and/or OR gates may be configured to produce a signal only if the combination of component sensor signals from the individual component sensors indicates that the extendable service component is out of its home configuration.

The wireless transmitter 226 is adapted to transmit a wireless extended service component alert signal 238 in response to a command or signal from the controller 228, so as to provide at least one alert 240 on at least one receiver 242 that is remote from the service vehicle 214 (i.e. the receiver(s) 242 are not carried on the service vehicle 214). The wireless transmitter 226 typically does not transmit the wireless extended service component alert signal 238 directly to the receivers 242 (i.e. a point-to-point transmission), but instead makes use of the public switched telephone network ("PSTN") 244. For example, the wireless transmitter 226 carried by the service vehicle 214 may comprise a cellular communication unit coupled to the PSTN 244. In some embodiments, the wireless transmitter 226 may be coupled to the location module 234 to provide location information thereto (e.g. to support cellular triangulation). The receiver(s) 242 may include, for example, one or more networked mobile wireless telecommunication computing devices (e.g. smartphones) of a supervisor tasked with overseeing operation of a fleet that includes the service vehicle 214).

The controller 228 receives signals from the component sensor input 222 and the speed signal input 224, and is configured to use the component sensor signal and the speed information signals to drive the transmitter to transmit the extended service component alert signal 238. Depending on the configuration of the monitoring system 220 and the external systems with which the monitoring system 220 interacts, the extended service component alert signal 238 may take a number of forms. In some embodiments, the extended service component alert signal 238 may, in and of itself, be an indication that the extendable service component 216 is out of its home configuration while the speed of the service vehicle 214 exceeds a speed threshold. In other embodiments, the extended service component alert signal 238 may contain or embody information used by an external system to determine whether the extendable service component 216 is out of its home configuration while the speed of the service vehicle 214 exceeds a speed threshold. For example, in some embodiments, the wireless transmitter 226 may transmit a wireless message into the PSTN 244 to be received by an external intermediary, such as a control station 246. The control station 246 may comprise one or more server computers which are coupled to the PSTN 244 to receive information about the location and status of a plurality of service vehicles, such as the exemplary service vehicle 214 shown in FIG. 2. For example, where the monitoring system 220 comprises an AVL unit, the control station 246 may receive information from the AVL units on each service vehicle.

In one embodiment, where the wireless transmitter 226 communicates with the control station 246, the controller 228 may be configured to use each component sensor signal and the speed information signals to drive the transmitter 226 to transmit the extended service component alert signal 238 so that the extended service component alert signal 238 comprises speed information about a speed of the service vehicle 214 and configuration information about whether the extendable service component 216 is out of its home configuration. This is a "back-end processing" configuration: the control station 246 can then use the speed information and the configuration information to determine whether the extendable service component 216 is out of its home configuration while the speed of the service vehicle 214 exceeds a speed threshold. If the control station 246 determines that the extendable service component 216 is out of its home configuration while the speed of the service vehicle 214 exceeds the speed threshold, the control station 246 can then assemble, address and transmit the alert(s) 240 through the PSTN 244 to the receiver(s) 242. As can be seen in FIG. 2, in one embodiment the receiver(s) 242 may include appropriate information systems (e.g. computerized dispatch systems or telephone dispatch) of a law enforcement agency, such as the local police or the highway patrol.

For example, in one particular implementation using back-end processing, the controller 228 may be configured to determine whether the extendable service component 216 is out of its home configuration (e.g. based on component sensor input 222) and, responsive to a determination that the extendable service component 216 is out of its home configuration, cause the transmitter 226 to transmit an extended service component alert signal 238 comprising speed information, for example current speed from the speed sensor 232 and/or location information from the location module 234 (e.g. two locations and the time interval therebetween). In this implementation, the extended service component alert signal 238 itself is the configuration information, since it is only sent if the extendable service component 216 is out of its home configuration—the fact that the signal was sent is configuration information that indicates that the extendable service component 216 is out of its home configuration. The control station 246 can then use the speed information to determine if the speed of the service vehicle 214 exceeds the threshold, for example by direct comparison of speed sensor information to the threshold, or by calculating speed using change in GPS position over time and comparing the calculated speed to the threshold. In another particular implementation, the controller 228 may be configured to cause the transmitter 226 to periodically transmit an extended service component alert signal 238 comprising speed information and configuration information regardless of whether the extendable service component 216 is out of its home configuration. In such an embodiment, the control station 246 could use the speed information and the configuration information to determine whether the extendable service component 216 is out of its home configuration while the speed of the service vehicle 214 exceeds the speed threshold.

In another embodiment, the controller 228 may be configured to use each component sensor signal and the speed information signals to determine whether the extendable service component is out of its home configuration while the speed of the service vehicle exceeds a speed threshold. In such an embodiment, the controller 228 may be further configured to, responsive to a determination that the extendable service component is out of its home configuration while the speed of the service vehicle exceeds the speed threshold, drive the transmitter 226 to transmit the extended service component alert signal. This is a "front-end processing" configuration. Thus, in such an embodiment the extended service component alert signal 238 is itself an indication that the extendable service component 216 is out of its home configuration while the speed of the service vehicle 214 exceeds the speed threshold. The extended service component alert signal 238 can be transmitted to an intermediary, for example the control station 246, which can then assemble, address and transmit the alert(s) 240 through the PSTN 244 to the receiver(s) 242. Alternatively, the extended service component alert signal 238 provides the alert(s) 240 on the receiver(s) 242 by way of the transmitter 226 wirelessly transmitting the message(s) directly to the receivers 242 through the PSTN 244. Thus, the extended service component alert signal 238 may be the transmission of a text message, automated phone call or e-mail. The controller 228 (or a separate controller associated with the wireless transmitter 226) may be configured to assemble, address and transmit the phone call(s), text message(s) and/or e-mails through the PSTN 244 to the destination receiver(s) 242. Alternatively, where the monitoring system 220 comprises an AVL unit, it may be coupled to a separate, dedicated wireless communication device, such as a ruggedized, preprogrammed wireless telephone, which may assemble, address and transmit the phone call(s), text message(s) and/or e-mails through the PSTN 244 in response to a command from the controller 228.

Figure 3:
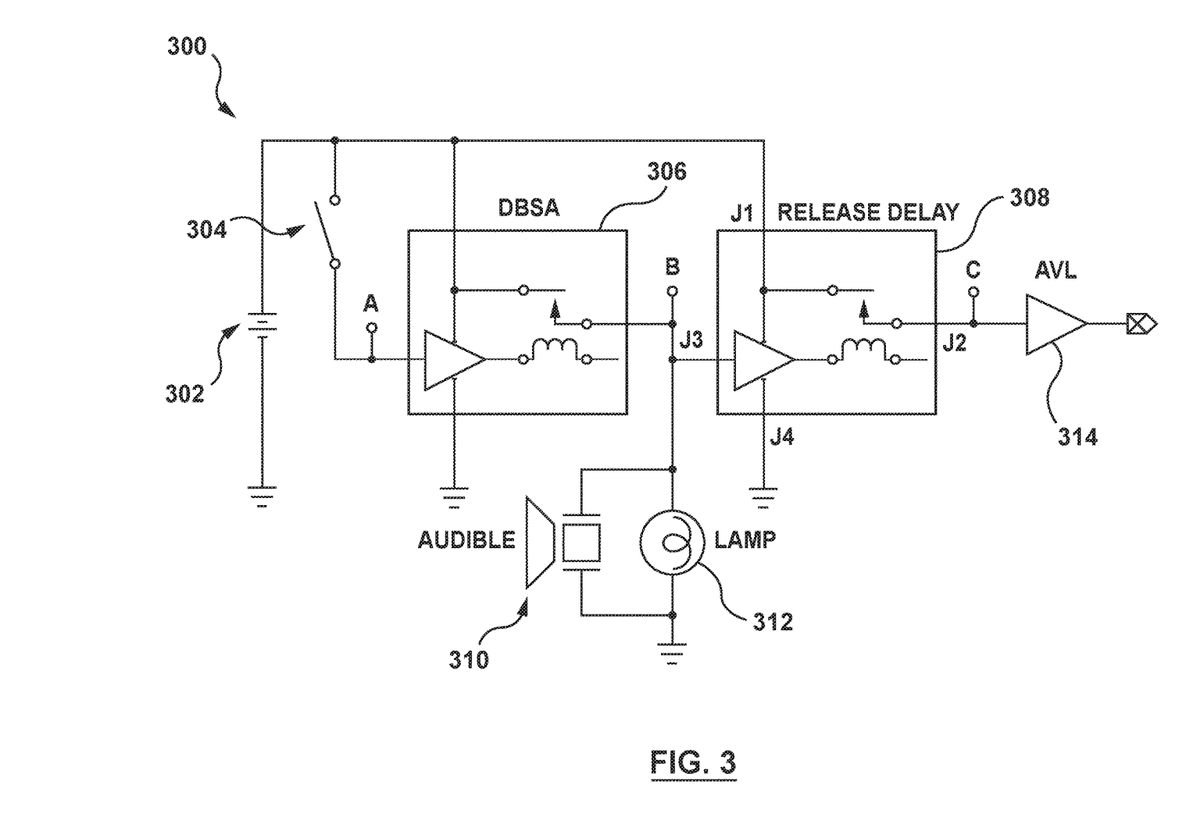
FIG. 3 is a circuit schematic for a driver alert circuit for one exemplary implementation of a monitoring system according to an aspect of the present disclosure.

Reference is now made to FIG. 3, in which a circuit schematic for a driver alert circuit for one exemplary implementation of a monitoring system is indicated generally at reference 300. The driver alert circuit 300 is designed to accommodate a single component sensor input signal; one skilled in the art, now informed by the present disclosure, can adapt the driver alert circuit 300 to accommodate multiple component sensor input signals (e.g. using AND and/or NAND and/or OR gates). The driver alert circuit 300 comprises an electrical source 302 (e.g. a vehicle battery), a component sensor 304 (shown as a normally-open switch for simplicity of illustration; other suitable sensors may also be used), a dump box switch assembly (DBSA) module 306, a delay module 308, a buzzer 310, a lamp 312 and an AVL unit 314. Although the illustrated module 306 is referred to as a "dump box" switch assembly, this is merely for consistency with the dump truck shown in FIG. 2 for purposes of illustration and is not intended to limit application of the technology to dump trucks. The electrical source 302 may be, for example, an ignition electrical source, so that it will receive power only if the vehicle ignition has been activated. The AVL unit periodically (e.g. ten times per second, once per second, once every ten seconds, or some other interval) transmits data about the location of the vehicle, and may also transmit additional information (e.g. whether the vehicle is travelling faster than a predetermined speed).

In FIG. 3, the DBSA module 306 and the delay module 308 are shown as generic control circuits for purposes of illustration; particular implementations will be described further below. The DBSA module 306 controls the buzzer 310 and the lamp 312, and the delay module 308 receives a signal (current) from the DBSA module 306 and, if the signal persists for a predetermined period, for example three seconds or five seconds, the delay module 308 outputs a signal to a direct input terminal of the AVL unit 314. The buzzer 310 and the lamp 312 would be located in the vehicle cab to be audible and visible, respectively, to a vehicle operator.

With the component sensor 304 closed, current can flow into and through the DBSA module 306 to reach the buzzer 310, lamp 312 and delay module 308, and can further flow through the delay module 308 to reach a direct input terminal of the AVL unit 314. As such, the buzzer 310 will provide an audible alert to the operator and the lamp will provide a visible alert to the operator indicating that the extendible vehicle component is out of its home configuration. Moreover, if this condition persists beyond a predetermined delay period, the delay module 308 will provide a signal to a direct input terminal of the AVL unit 314. As can be seen in FIG. 3, for the delay module 308, junction J1 receives +12 VDC circuit power from the electrical source 302, junction J2 provides a +12 VDC output signal to a direct input terminal of the AVL unit 314, junction J3 receives a DC input signal from the output of the DBSA module 306 and junction J4 is coupled to signal and power ground (common). In FIG. 3, "A" denotes the trigger voltage from the switch 304 (e.g. a magnetic switch), "B" denotes intermittent +12 VDC output from the DBSA module 306, and "C" denotes continuous +12 VDC output to the AVL unit 314.

The component sensor 304 may, in a dump truck embodiment, be a suitably ruggedized two-part magnetic switch in which the switch portion is mounted on the chassis and the magnetic portion is mounted on the dump box. With the dump box down (i.e. in the home configuration), the magnetic portion will maintain the switch portion in an open configuration, preventing current from reaching the DBSA module 306, which in turn prevents current from reaching the buzzer 310 or lamp 312, or from reaching the delay module 308 and the AVL unit 314.

Exemplary implementations of the DBSA module 306 and the delay module 308 will now be described.

The DBSA module 306 may be a universal programmable timer circuit configured as an oscillator. For example, in one exemplary implementation the DBSA module 306 may be a model "TM1 Plus" timer circuit, offered by Labco Ltd., having an address at 79 Laroche, Repentigny, Quebec, Canada J6A 7M3. Thus, when the component sensor 306 is closed, the DBSA module receives a constant DC trigger signal and outputs an intermittent or pulsed signal to cause buzzer 310 to buzz intermittently and cause the lamp 312 to flash. Other suitable circuits may also be used for the DBSA module.

Figure 4:
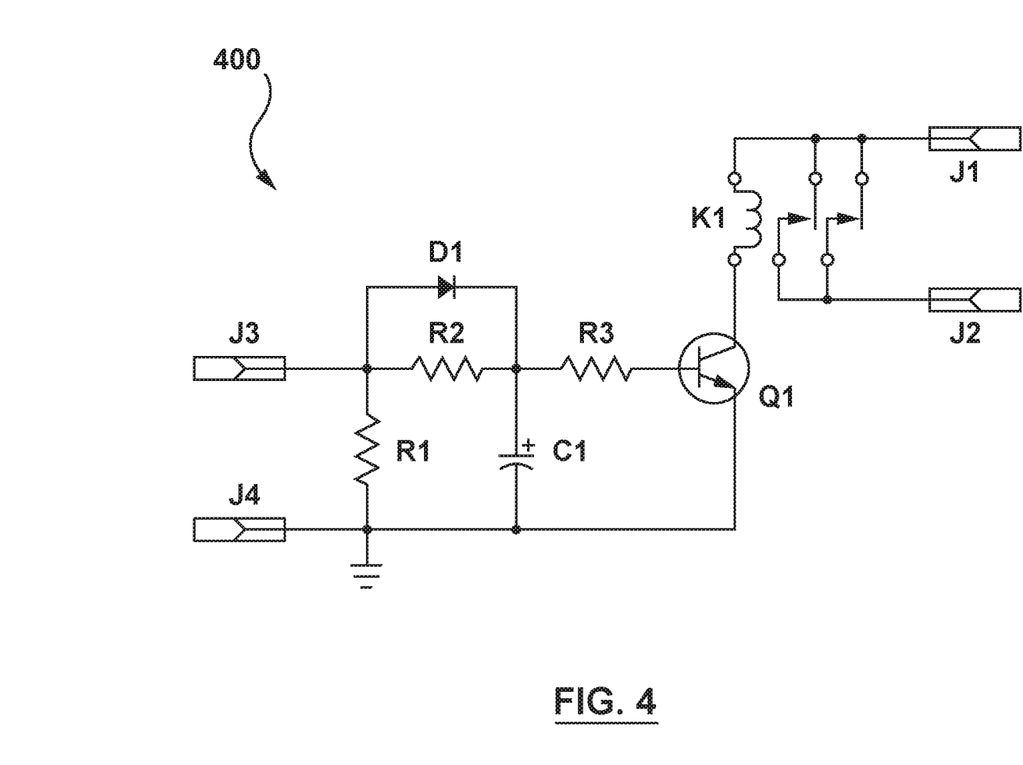
FIG. 4 is a circuit schematic for one exemplary implementation of delay module forming part of the driver alert circuit of FIG. 3.

Reference is now made to FIG. 4, in which a circuit schematic for one exemplary implementation of delay module 308 is indicated generally by reference 400. The delay circuit 400 comprises connectors for junctions J1, J2, J3 and J4, a diode D1, resistors R1, R2, R3, capacitor C1 and an open collector switch Q1 that energizes relay K1 when its base voltage exceeds approximately 0.5 VDC.

DC supply voltage +12 VDC and ground are applied to the connectors for junctions J1 and J4, respectively. As long as the input voltage at junction J3 is no greater than 1.0 VDC, i.e. because the component sensor 304 (FIG. 3) is open and no current flows through the DBSA module 306 (FIG. 3), the relay K1 is not energized and the delay circuit 400 is not active.

If the component sensor 304 closes (e.g. the dump box is raised), current flows through the DBSA module 306 and +12 VDC is applied to the delay circuit 400 at junction J3, and the capacitor C1 charges through the diode D1. The RC time constant of D1, C1 is insignificant in this application and the charge voltage at the capacitor C1 is immediately realized at +12 VDC-0.5 VDC (diode forward voltage drop). The resistor R3 is a base current limiting resistor and is transparent in the delay circuit 400. When the capacitor C1 is charged above 0.5 VDC the collector switch Q1 conducts and energizes the relay K1, so that a +12 VDC signal can be measured at junction J2, which is coupled to an input terminal of the AVL 314 (FIG. 3). If the +12 VDC signal is removed from the junction J3, the capacitor C1 discharges through the network R2 and R1. The values of these resistors R1, R2 determine the discharge time. K1 relay is in an energized state as long as the voltage at C1 is above 0.5 VDC. Thus, the delay circuit 400 can output a constant +12 VDC signal at junction J2 in response to a pulsed or intermittent +12 VDC signal from the DBSA module 306 at junction J3, and impose a delay on the triggering of the constant +12 VDC signal at junction J2.

Note that the resistor R1 also acts as a load on the input at junction J3 to prevent the delay circuit 400 from switching on in the event that the input becomes disconnected from its trigger source (e.g. the DBSA module 306). The resistor R1 drains any small value extraneous voltage to ground.

Exemplary values for the diode D1, resistors R1, R2, R3, capacitor C1 and collector switch Q1 are shown in the table below:

TABLE 1

| DESIGNATION | VALUE |
| --- | --- |
| R1 | 10 KOhm |
| R2 | 47 KOhm |
| R3 | 10 KOhm |
| C1 | 100 uF |
| D1 | 1N4148 |
| Q1 | MPSA13 |

Other suitable values, and other suitable circuit designs, may also be used for the delay circuit.

Figure 5:
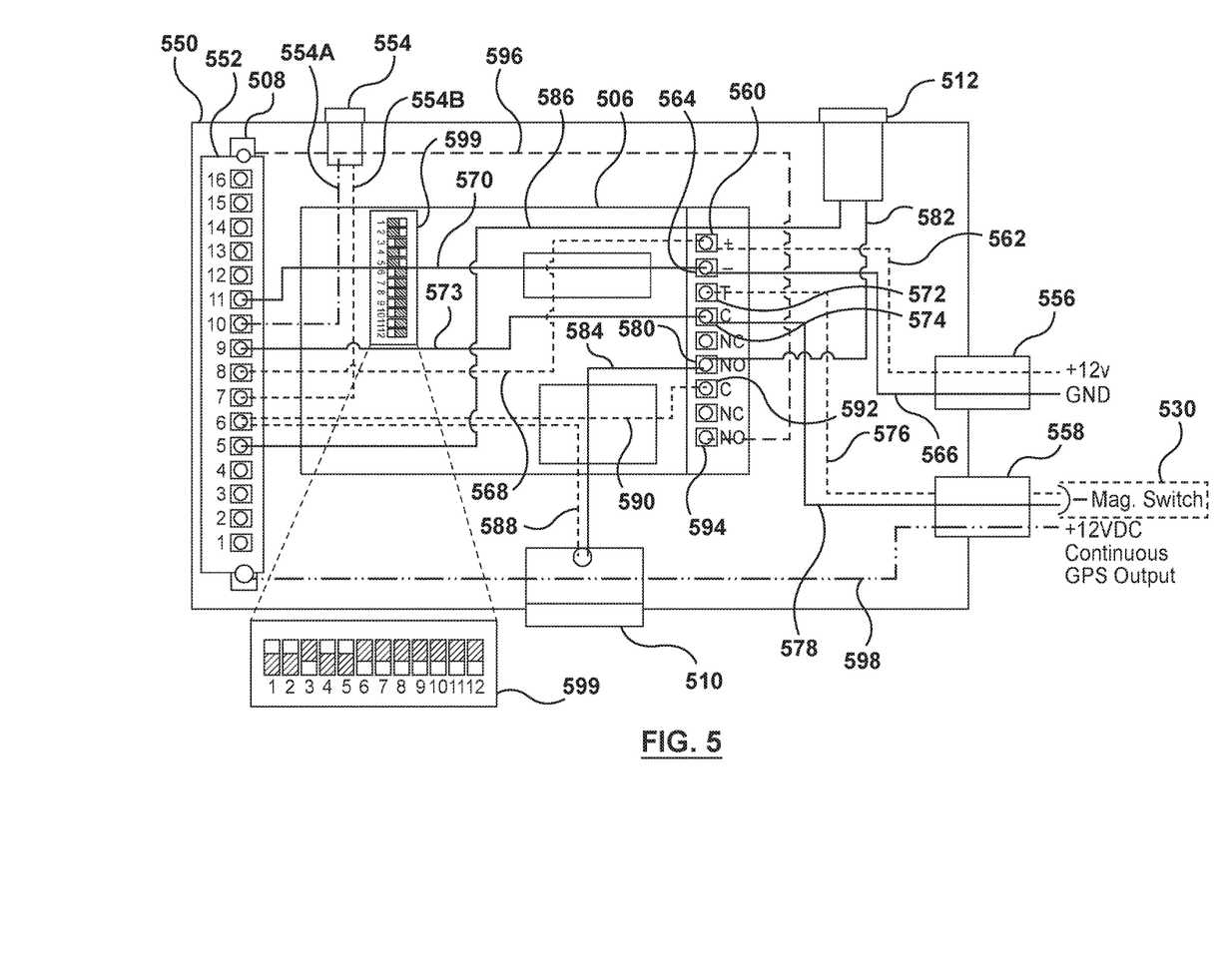
FIG. 5 is a schematic representation showing one exemplary assembly of a DBSA module, a delay circuit, a buzzer and a lamp within an enclosure along with the interconnections among the components.

Referring now to FIG. 5, one exemplary assembly of a DBSA module, a delay circuit, a buzzer and a lamp within an enclosure is shown schematically along with the interconnections among the components. The enclosure, indicated at reference 550, may be, for example, a model 1591 FLBK multipurpose ABS plastic enclosure offered by Hammond Mfg. Co. Ltd., having an address at 394 Edinburgh Road North, Guelph, Ontario, Canada, N1H 1E5, or another suitable enclosure. Housed within the enclosure are the DBSA module 506, in this case a TM1 Plus timer circuit as described above, a terminal strip 552 and a delay circuit 508 as described above. In the view shown in FIG. 5, the delay circuit 508 is slotted into the enclosure 550 underneath/behind the terminal strip 552. The buzzer 510, lamp 512 and a power indicator 554 protrude through the enclosure 550, as do a power connection terminal 556 and a signal connection terminal 558. The buzzer 510 may be, for example, a model 61-232-0 buzzer offered by Mode Electronics Ltd. having an address at 211-2999 Underhill Avenue, Burnaby, B.C., Canada V5A 3C2 and the lamp 512 may be, for example, a model 55-472-0 lamp offered by the aforementioned Mode Electronics Ltd. Other suitable components may also be used.

On the terminal strip 552, terminals 5 to 8 are coupled to one another (e.g. by jumpers) and terminals 9 to 12 are coupled to one another (e.g. by jumpers). The positive terminal 560 on the DBSA module 506 is coupled, by way of wire 562 passing through power connection terminal 556, to a vehicle fuse panel (e.g. fused at 2A) to receive +12 VDC. The negative terminal 564 on the DBSA module 506 is coupled, by way of wire 566 passing through power connection terminal 556, to ground (e.g. vehicle ground). The set of terminals 5 to 8 on the terminal strip 552 are coupled to +12 VDC by way of a wire 568 connecting the positive terminal 560 on the DBSA module 506 to terminal 8 on the terminal strip 552. Similarly, the set of terminals 9 to 12 on the terminal strip 552 are coupled to ground by way of a wire 570 connecting the negative terminal 564 on the DBSA module 506 to terminal 11 on the terminal strip 552; terminal 9 on the terminal strip 552 is coupled to the first common terminal 574 on the DBSA module 506 by way of wire 573. The power indicator 554 is coupled, by way of wires 554A and 554B, to terminals 10 and 7, respectively, on the terminal strip 552 so that the power indicator 554 will be illuminated whenever the DBSA module 506 is receiving current from the vehicle power supply.

The trigger terminal 572 and the first common terminal 574 on the DBSA module 506 are coupled, by way of respective wires 576, 578 passing through signal connection terminal 558, to a component sensor 530 (e.g. a magnetic switch); the common terminal 574 grounds the component sensor 530. A first normally open terminal 580 on the DBSA module 506 is connected by a first wire 582 to the lamp 512 and by a second wire 584 to the buzzer 510. The lamp 512 receives +12 VDC by way of a wire 586 running between the lamp 512 and terminal 5 on the terminal strip 552, and the buzzer 510 receives +12 VDC by way of a wire 588 running between the buzzer 510 and terminal 6 on the terminal strip 552; terminal 6 on the terminal strip 552 is also coupled by a wire 590 to the second common terminal 592 on the DBSA module 506.

The second normally open terminal 594 on the DBSA module 506 is coupled by way of wire 596 to the J3 input (FIG. 3) on the delay circuit 508, whose J2 output (FIG. 3) is coupled, by way of wire 598 and the signal connection terminal 558, to the AVL unit (or other device). A set of dip switches 599 controls the configuration of the DBSA module 506, and are shown set for one second on, one second off oscillation when a signal is received at the trigger terminal 572 (e.g. if the dump box on a dump truck is raised).

The driver alert circuit described above is merely one exemplary implementation, and one skilled in the art, now informed by the present disclosure, can provide alternate implementations of a driver alert circuit, using hardware alone or a combination of hardware or software.

As can be seen from the above description, the systems and methods described herein represent significantly more than merely using categories to organize, store and transmit information and organizing information through mathematical correlations. The systems and methods are in fact an improvement to the technology of service vehicles having extendible service components, as they provide an ability to notify parties besides the operator of potentially dangerous operation of the service vehicle. This facilitates the ability of an agent other than the operator to take preventative action to prevent injury and property damage. Moreover, the systems and methods can be applied by using a particular machine, namely a service vehicle having one or more extendible service component. As such, the systems and methods can be confined to the use of specific types of service vehicles in construction, maintenance and service applications.

One or more currently preferred embodiments have been described by way of example. It will be apparent to persons skilled in the art that a number of variations and modifications can be made without departing from the scope of the invention as defined in the claims.

What is claimed is:

1. A method for monitoring operation of a service vehicle, the method comprising:
   monitoring a configuration of an extendable service component of the service vehicle;
   monitoring a speed of the service vehicle; and
   responsive to a determination that the extendable service component is out of its home configuration while the speed of the service vehicle exceeds a speed threshold, providing at least one wireless alert on at least one receiver remote from the service vehicle.

2. The method of claim 1, further comprising:
   monitoring a position of the service vehicle; and
   using the position of the service vehicle to set the speed threshold.

3. The method of claim 1, wherein the at least one receiver comprises a wireless mobile telephone and the at least one alert comprises a text message.

4. The method of claim 1, wherein the at least one receiver comprises a wireless mobile telephone and the at least one alert comprises a telephone call.

5. A monitoring system for monitoring operation of a service vehicle, the monitoring system comprising:
   at least one component sensor input, each component sensor input being adapted to receive a respective component sensor signal representing a configuration of an extendable service component of the service vehicle;
   a speed signal input adapted to receive speed information signals representing a speed of the service vehicle;
   a wireless transmitter adapted to wirelessly transmit an extended service component alert signal to provide at least one alert on at least one receiver remote from the service vehicle; and
   at least one controller coupled to the at least one component sensor input and the speed signal input and configured to use each component sensor signal to drive the transmitter to transmit the extended service component alert signal.

6. The monitoring system of claim 5, wherein the at least one controller is configured to use each component sensor signal and the speed information signals to drive the transmitter to transmit the extended service component alert signal so that the extended service component alert signal comprises speed information about a speed of the service vehicle and configuration information about whether the extendable service component is out of its home configuration.

7. The monitoring system of claim 5, wherein the at least one controller is configured to use each component sensor signal and the speed information signals to:
   determine whether the extendable service component is out of its home configuration while the speed of the service vehicle exceeds a speed threshold; and
   responsive to a determination that the extendable service component is out of its home configuration while the speed of the service vehicle exceeds a speed threshold, drive the transmitter to transmit the extended service component alert signal.

8. The monitoring system of claim 5, wherein:
the speed signal input is adapted to be coupled to a speed sensor of the service vehicle and the speed information signals comprise speed sensor signals.

9. The monitoring system of claim 5, wherein:
the speed signal input comprises a location module adapted to continuously update a location of the service vehicle and the speed information signals are the locations of the service vehicle; and
the at least one controller is configured to determine the speed of the service vehicle by comparing changes in the location to elapsed time between locations.

10. The monitoring system of claim 9, wherein the at least one controller is configured to use the location of the service vehicle to set the speed threshold.

11. The monitoring system of claim 5, wherein the monitoring system comprises an automatic vehicle locator (AVL) unit.

12. The monitoring system of claim 11, wherein, the speed signal input, wireless transmitter and controller all form part of the AVL unit.

13. The monitoring system of claim 12, wherein each component sensor input is a direct input terminal to the AVL unit.

14. The monitoring system of claim 12, wherein each component sensor input comprises:
to a direct input terminal to the AVL unit; and
a driver alert circuit electrically interposed between the respective component sensor and the direct input terminal;
the driver alert circuit configured to, responsive to a signal indicating that that the extendable service component is out of its home configuration:
provide at least one of an audible and a visual indicator in a driver cab of the vehicle; and
pass the component sensor signal to the direct input terminal.

15. The monitoring system of claim 14, wherein the driver alert circuit includes a delay circuit which delays passage of the component sensor signal to the direct input terminal for a predetermined period following activation of the at least one of the audible and the visual indicator.

16. A monitoring system for monitoring operation of a service vehicle, the monitoring system comprising:
at least one component sensor, each component sensor input being adapted to provide a respective component sensor signal representing a configuration of an extendable service component of the service vehicle;
at least one component sensor input, each component sensor input being adapted to receive the respective component sensor signal;
an automatic vehicle locator (AVL) unit, the AVL unit comprising:
a speed signal input adapted to receive speed information signals representing a speed of the service vehicle;
a wireless transmitter adapted to wirelessly transmit an extended service component alert signal to provide at least one alert on at least one receiver remote from the service vehicle; and
at least one controller coupled to the at least one component sensor input and the speed signal input and configured to use each component sensor signal to drive the transmitter to transmit the extended service component alert signal;
each component sensor input comprising:
a direct input terminal of the AVL unit; and
a driver alert circuit electrically interposed between the respective component sensor and the direct input terminal;
the driver alert circuit configured to, responsive to a signal indicating that that the extendable service component is out of its home configuration:
provide at least one of an audible and a visual indicator in a driver cab of the vehicle; and
pass the component sensor signal to the direct input terminal;
wherein the driver alert circuit includes a delay circuit which delays passage of the component sensor signal to the direct input terminal for a predetermined period following activation of the at least one of the audible and the visual indicator.

* * * * *

UNITED STATES PATENT AND TRADEMARK OFFICE
CERTIFICATE OF CORRECTION

PATENT NO. : 10,106,175 B1
APPLICATION NO. : 15/939113
DATED : October 23, 2018
INVENTOR(S) : Michael Shirchenko et al.

Page 1 of 1

It is certified that error appears in the above-identified patent and that said Letters Patent is hereby corrected as shown below:

In the Claims

In Column 13, Line 27, Claim 14, change "to a direct" to --a direct--.

In Column 13, Line 32, Claim 14, change "that that" to --that--.

In Column 14, Line 31, Claim 16, change "that that" to --that--.

Signed and Sealed this
Sixth Day of August, 2019

Andrei Iancu
*Director of the United States Patent and Trademark Office*